F. F. CHANDLER AND H. G. MYERS.
TRACTOR.
APPLICATION FILED JUNE 14, 1917.

1,361,964.

Patented Dec. 14, 1920.
7 SHEETS—SHEET 1.

UNITED STATES PATENT OFFICE.

FRANKLIN F. CHANDLER AND HENRY G. MYERS, OF INDIANAPOLIS, INDIANA, ASSIGNORS TO ADAPTABLE TRACTOR CO., OF INDIANAPOLIS, INDIANA, A CORPORATION OF INDIANA.

TRACTOR.

1,361,964. Specification of Letters Patent. Patented Dec. 14, 1920.

Application filed June 14, 1917. Serial No. 174,675.

*To all whom it may concern:*

Be it known that we, FRANKLIN F. CHANDLER and HENRY G. MYERS, citizens of the United States, residing at Indianapolis, in the county of Marion and State of Indiana, have invented certain new and useful Improvements in Tractors, of which the following is a specification.

This invention relates to a tractor which possesses great flexibility of control, and which will readily and quickly respond to the will of the operator whether driven from the tractor or elsewhere, and being not only sufficiently small to be capable of general use around a farm, but also possessed of sufficient power to accomplish many kinds of heavy work.

One of the objects of this invention is to provide a tractor of improved design in which the bulk of the weight is substantially located over the two drive wheels with the remainder of the weight carried at the end of a tail beam by a swinging caster wheel.

A further object of this invention is the provision and arrangement of improved driving gears such that the tractor may be driven straight ahead or backward and may be turned in a circle of any desired radius between the limits, infinity and one-half the length of the driving wheel axle, thus making possible a long sweeping turn or a short, abrupt turn about the vertical axis of the machine.

Another object of the invention is to provide a tractor which can be easily and quickly attached to a wagon, plow, cultivator, or the like, for moving the same, or which can be instantly transformed into a stationary power plant for the accomplishment of various kinds of work around the farm or elsewhere, such as sawing wood, driving cream separators, corn shellers, sowers, churns, wells, shredders, and the like.

A further object is to control movements of the tractor through control mechanism by movement of reins, or the like, in a direction similar to the direction of movement desired in the tractor, after the manner of driving and guiding a horse or horses, and to provide means for completely reversing the setting of the control mechanism to give normal forward movement in the opposite direction.

Another object of this invention is to provide a steering mechanism for the tractor of such nature that the caster wheel may either be positively steered or be allowed to swing free, as desired.

A still further object is such an arrangement of tail beam that the caster wheel may be carried on either side of the center line of the machine or any intermediate position, as desired.

A further object of this invention is to provide such a combination, construction, and arrangement of parts as will result in a simple, easily operated, efficacious and economical device.

Further objects and advantages will appear as the following description proceeds, and while we have shown a preferred embodiment in the accompanying drawings, we desire it to be understood that the same is susceptible of modification and change without departing from the spirit of our invention, except as limited by the appended claims.

In the drawings:

Fig. 4ª is a detail side elevation of the reverse plate.

Figure 5:
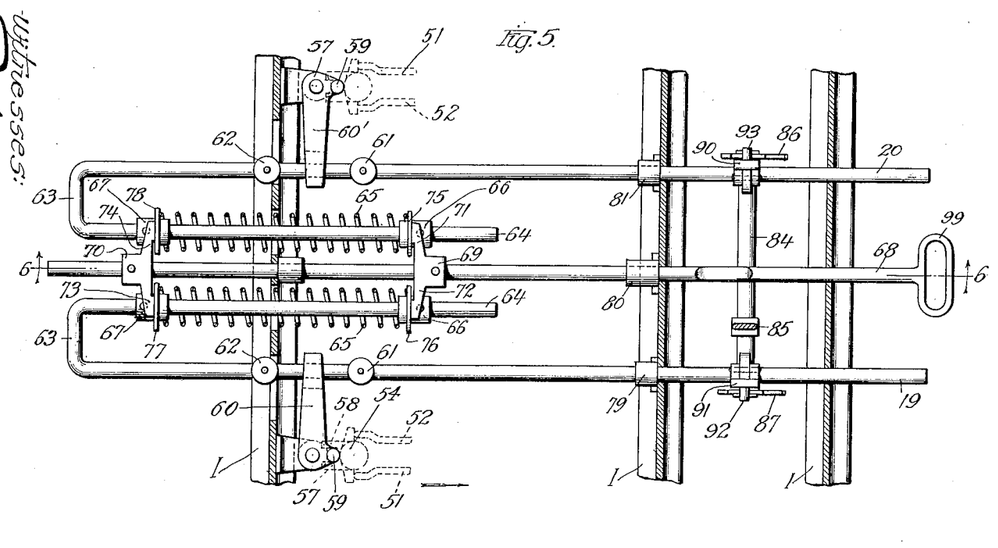
Fig. 5 is a fragmentary detail sectional view on the line 5—5 of Fig. 1.

In the drawings, the frame work 1, which may be constructed of I beams or other suitable material, has secured to the underside thereof the brackets 2, in which are secured the stub axles 3, upon each end of which are rotatably mounted the bull wheels or drive wheels 4. These wheels are composed of the rim 5, spokes 6 and the annular gear 7, the teeth 8 of which mesh with the teeth on the drive pinions 9, rotatably mounted on the drive shafts 10. Suitably mounted upon the frame is a gas engine 12 or other suitable source of motive power, whose engine shaft 11 has regulatable driving connections with the drive shafts 10. Also mounted upon the frame is a radiator 13, for the cooling of which the fan 14 is suitably driven by means of a belt and pulley connection with said engine shaft 11. At one end of the frame 1 is mounted the operator's seat 15, within suitable reaching distance of the control handles 16 and 17, located upon each side respectively of the center line of the device. These handles 16 and 17 are rigidly connected at their lower ends to the control rods 19 and 20, by means of the socket castings 16', 17', which are adjustably secured to the control rods, (shown in neutral position in Fig. 5,) which are in turn slidably mounted in the frame 1. The socket in these castings is formed to receive the lower end of the handle. Handles of different configuration may be inserted in these sockets, for example, handles having an offset portion to provide extensions for the purpose of positioning the operative part of the handle in varying positions as desired.

Figure 2:
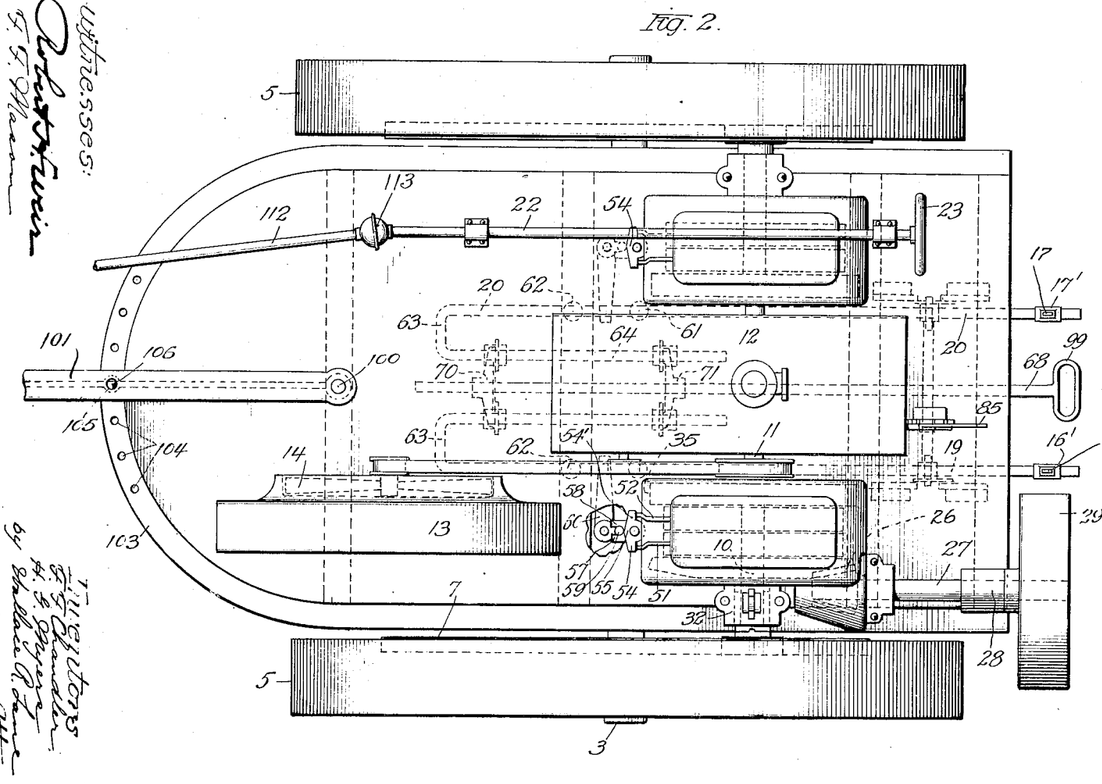
Fig. 2 is a plan view of Fig. 1.
Figure 7:
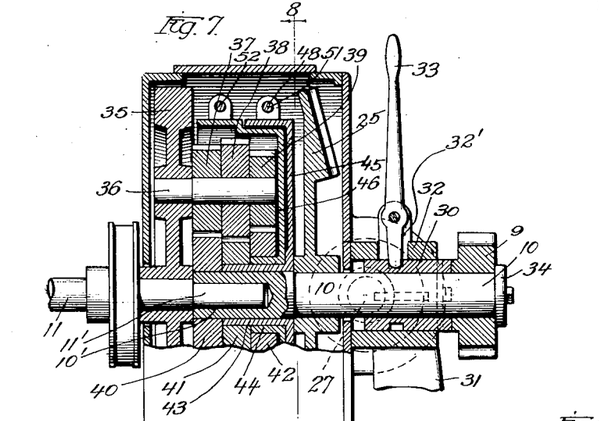
Fig. 7 is a partial transverse vertical sectional view through the line 7—7 of Fig. 1.

Fixedly mounted upon one side of the frame work is a supporting pedestal 21, in the upper end of which is journaled the steering rod 22, which rod is operated by means of the hand wheel 23; the steering rod 22 being journaled near its opposite end in the upper end of the supporting pedestal 24, which is also fixedly mounted on the frame. Adjacent the outer end of the engine shaft 11 is mounted a suitable planetary gearing by means of which motion is transmitted to the drive shaft 10, upon which and removed from the end thereof is fixedly mounted a beveled gear 25, which engages the beveled pinion 26, which in turn rotates the utility shaft 27, which is journaled in the pedestal 28, and which carries adjacent its end a suitable driven wheel 29, (see Fig. 2,) which can be readily removed or placed thereon as desired. The driven wheel 29 may assume the form of a hoisting winch, cable drum, sprocket wheel, crank or the like, any one of which may be be interchangeably secured upon the end of the shaft 27, as desired. Upon the outer end of the shaft 27 is a suitable cam for use in cranking the engine. Also mounted upon the drive shaft 10 and located between the hub of the gear 25 and the driving pinion 9, is a clutch 30, which is slidably keyed to the shaft 10, and which on its end face is of suitable clutch formation. The clutch 30 is journaled in a suitable pedestal 31 mounted upon the frame 1, which clutch in turn supports the shaft 10. Fulcrumed on an upwardly extending ear 32', formed integrally with the cap plate 32 of the journal box on the pedestal 31, is an operating lever 33, the lower end of which extends downwardly through an opening in the cap plate 32 and engages a circumferential groove in the clutch 30, as best shown in Fig. 7, by means of which lever the sliding clutch 30 may be readily thrown into and out of engagement with the pinion. When it is desired to transmit power through the driven wheel 29, both control rods will first be placed in neutral position to cause the tractor to remain stationary, then the lever 33 as shown in Fig. 7 will be thrown to the right, which movement will move the clutch 30 away from the pinion 9, thus disengaging these parts. Then by suitable operation of the control rod 19, in the manner to be hereinafter fully described, the shaft 27 with its driven wheel 29 may be rotated in either direction, or stopped, as desired, thus quickly converting our tractor into a stationary power plant. A suitable clutch may also be provided for throwing the utility shaft 27 into or out of engagement with the beveled gear 25 in order that this shaft may be permitted to remain stationary when it is not being used to transmit power. The pinion 9 is held in position for rotation upon the shaft 10 by means of the collar 34 or other suitable enlargement on the end of the shaft 10.

Figure 8:
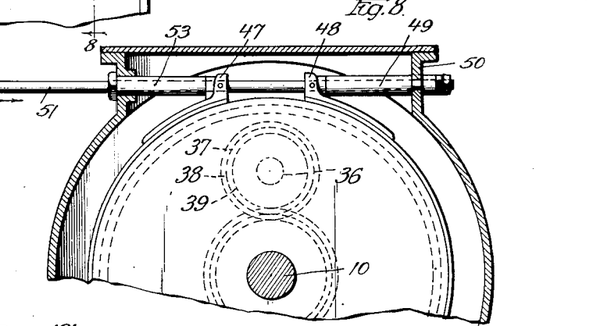
Fig. 8 is a fragmentary sectional view taken on the line 8—8 of Fig. 7.

Adjacent the end of the engine shaft 11 (which has constant direction of motion) is mounted the fly wheel 35, in which are pressed the pins 36, three in number (but one being shown) upon each of which is mounted the three gears 37, 38 and 39 to mesh with the gears 40, 41 and 42 respectively. The gears 37, 38 and 39 are all pinned together and operate in unison. The gear 40 is keyed rigidly upon the inner end of the drive shaft 10, while the gear 41 is keyed upon the sleeve 43, and the gear 42 keyed upon the sleeve 44. The reduced end 11' of the engine shaft 11 is mounted for rotation within the bore 10' of the inner end of the drive shaft 10. Formed integrally with the sleeves 43 and 44 are the brake drums 45 and 46 respectively. Around these drums are mounted resilient brake bands each carrying projections 47 and 48 (see Fig. 8.) The projections 48 as shown in Fig. 8 are held rigidly in position by means of sleeves 49, which in turn butt against the rear portion 50 of the gear casing, and in each of which sleeves is slidably mounted one of the rods 51 and 52, which are held from forward movement by nuts secured on the end thereof on the rear side of the portion 50. The left hand projections 47, (one being directly behind the other) shown in Fig. 8, of the resilient band normally stand away from their respective drums so that the bands are loose thereon. Sleeves 53 butt against the projection 47, and are rigidly secured upon the rods, so that when the desired rod is moved to the right, the respective resilient band will be tightened upon its drum and motion consequently imparted to the drive shaft 10 in the desired direction.

The operation of the planetary gearing described above will now be given. When neither of the two brake drums 45, 46 is prevented from moving, the rotation of the engine shaft 11 makes the gear 37 rotate about the gear 40, and consequently produces no rotation of the shaft 10, since the sleeve 43 is free to turn on the shaft 10 and the sleeve 44 free to turn on sleeve 43. If the brake drum 45 is prevented from rotating, the gear 41 is made to remain stationary, gear 38 rotates around gear 41, and as gear 37 is pinned to gear 38 it will be seen that motion will be given to gear 40 and consequently to shaft 10. With the gears in operation as just described, the relation of them is such as to produce motion of the shaft 10 in the same direction as the direction of motion of the engine shaft 11, but at a speed reduced in the proportion of about 7½ to 1. Of course, the relation of the gears may be designed to give any proportion desired.

Now if the brake drum 46 is prevented from turning and the drum 45 released, the gear 42 remains stationary and a reversal of motion of the shaft 10 is secured, because of a different proportion of gear relation of the gears 39 and 42. This reversed motion of the shaft 10 is still in the proportion of about 7½ to 1 so that the tractor will travel backward at practically the same speed as it travels forward. Because the general utility shaft 27 is geared to the drive shaft 10, the driven wheel 29 may also be driven forward, backward, or allowed to remain stationary by operating the control means of the tractor.

The rods 51, 52 (see Figs. 1 and 2) at their free end butt against the flat faces of the two projections or tappets 54, 54' of the casting 55, which casting is mounted on the upper end of the vertical rod 55', upon the lower end of which is mounted the slotted casting 56, having the arms 57, 58. Between these two arms 57, 58 (see Figs. 2 and 3) extends the pin 59, which pin is carried by the short arm of a bell crank, the long arm 60 of which is provided with a bifurcated portion which straddles the control rod 19 midway between the two projections 61, 62. A similar connection between the control rod 20 and the brake band rods is provided on the opposite side of the tractor.

The control rods 19 and 20 are each formed at one end with the reverse bend 63, from whence the portion 64 extends toward the operator's seat 15. Upon these portions 64 are mounted spiral springs 65.

Extending through the frame 1 and located midway between the control rods 19 and 20 is the main rod 68, which extends in length to the reverse bends 63 of the control rods. Secured to the portions 64 are the sleeves 66, 67, while secured to the main rod are the sleeve portions 69 and 70, which carry the oppositely projecting arms 71, 72, and 73, 74, respectively. Perforated plates 75, 76, 77 and 78, against which the ends of the springs 65 press, are slidably mounted on rods 19 and 20 and rest against the arms 71, 72, 73, 74, respectively. When the arms just referred to move away from the plates 75, 76, or 77, 78, these plates will rest against the sleeves 66, 66 or 67, 67 (see Fig. 5.) In order to provide more extended bearings for the control rods 19 and 20 and the main rod 68, suitable sleeves 79, 80 and 81 are secured to the frame 1 and through which sleeves the control rods and main rod pass.

Figures 4, 4A:
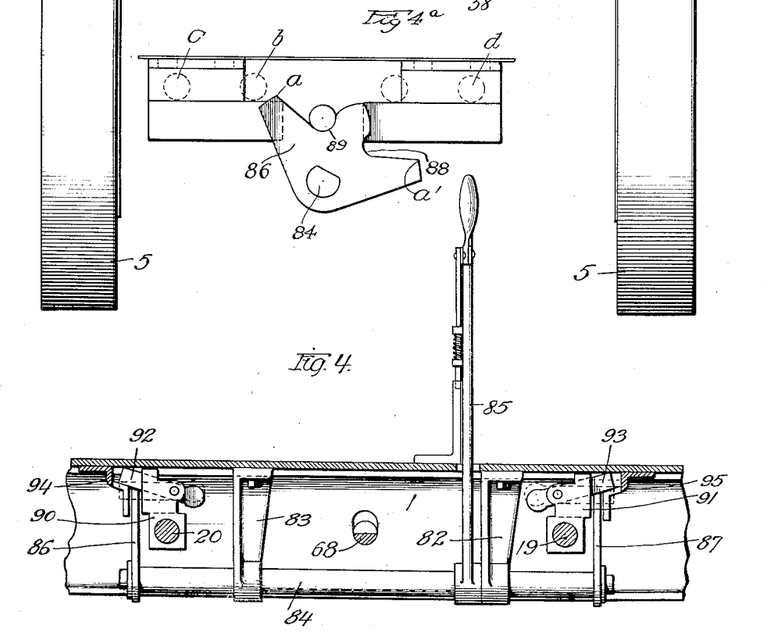
Fig. 4 is a fragmentary detail sectional view on the line 4—4 of Fig. 1, and showing the reverse mechanism.
Figure 6:
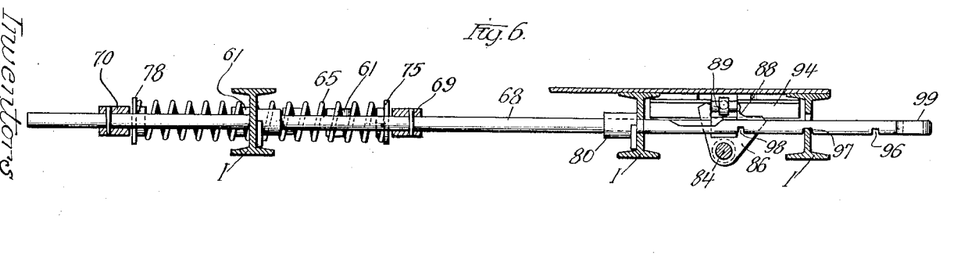
Fig. 6 is a sectional view taken on the line 6—6 of Fig. 5.

Secured to the frame 1 on the under side near the rear end thereof are hangers 82 and 83, in which is journaled the reverse shaft 84, upon which is rigidly mounted the reverse lever 85 (see Fig. 4.) Fixed to each end of the reverse shaft 84 are the reverse plates 86 and 87, which are provided in their upper portions with notches 88 and 89 (see Figs. 6 and 4ª.) Rigidly secured to the control rods 19 and 20 are suitable castings 90 and 91, in which are pivotally mounted latch pins 92 and 93. Also secured to the under portion of the frame 1 adjacent the reverse plates 86, 87 and slightly spaced on either side thereof, are angle plates or rests 94 and 95, upon which angle plates the ends of the latch pins 92 and 93 rest when out of engagement with the notches 88 and 89 (see Fig. 4ª.) One side of each of these notches it will be noticed is of an inclined or cam like formation, whereby the pins 92, 93 may readily ride from the angle plates into the notches when desired. In Fig. 6 it will be noted that the rear end of the main rod 68 is provided with notches 96, 97 and 98, any one of which may be slipped over the edge of the I beam in the frame 1 as shown. Slightly beyond the notch 98 the main rod 68 is made thinner in cross section, so that the same will be rendered more bendable, the purpose of which is to permit the notches 96, 97 and 98 to be raised and slipped over the I beam and returned again to their seat as desired. Upon the end of the main rod 68 is a suitable handle 99, which may be readily operated by the operator of the machine.

Figure 10:
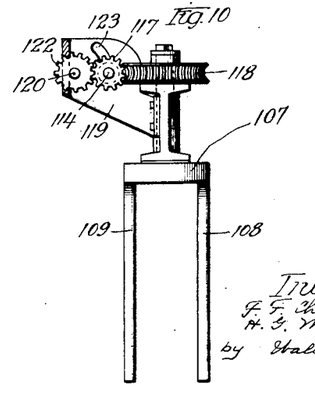
Fig. 10 is an end elevation thereof.
Figure 11:
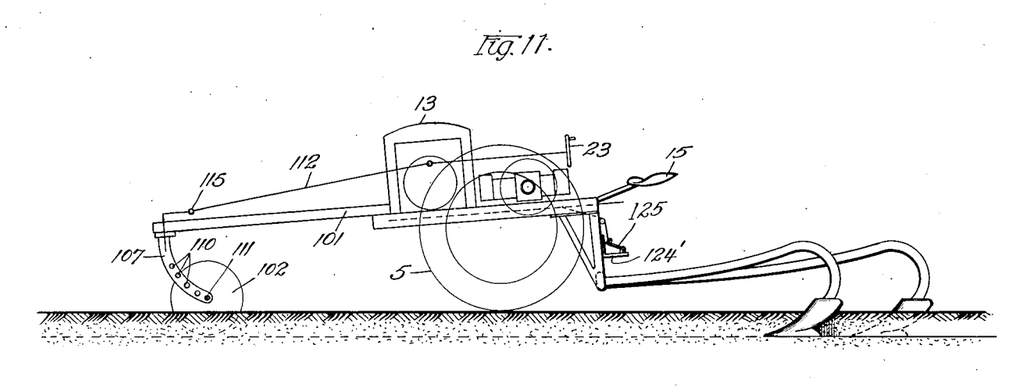
Fig. 11 is a diagrammatic elevation showing the application of our tractor to the work of drawing a plurality of plows.
Figure 14:
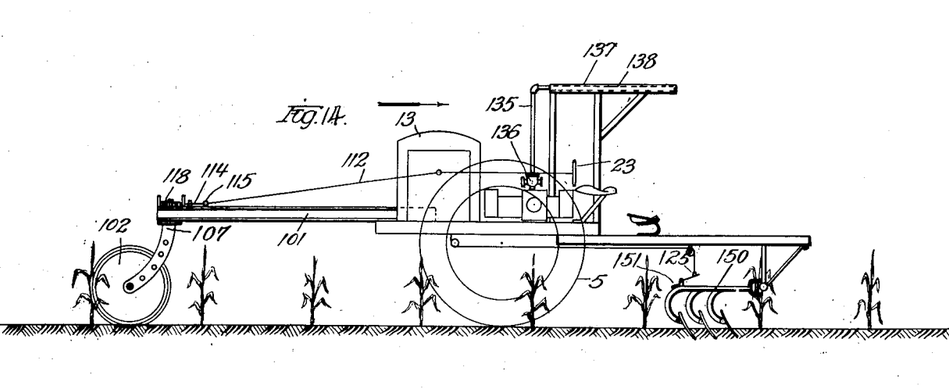
Fig. 14 is a diagrammatic view in elevation, showing our device as applied to the work of operating a cultivator.

Pivotally mounted upon the front end of the frame 1 by means of the pivot pin 100 is a tail beam 101, to the front or free end of which is pivotally secured the caster wheel 102 as seen in Figs. 11 and 14. The front end of the frame 1 is formed in the shape of a half circle, thus providing the curved bearing surface 103, upon which the tail beam 101 rests. Suitably spaced in the curved portion 103 are holes 104, with any one of which the hole 105 in the tail beam can be registered, and when this is done the tail beam may be secured in position by inserting a pin 106 through the registering holes, and thus be prevented from swinging around its pivot 100. As seen in Figs. 10, 11 and 14, the caster wheel 102 is mounted on the free end of the tail beam by means of the yoke 107, which is formed of the spaced side member 108 and 109, each of which carries a plurality of perforations 110 and a suitable axle 111, upon which the caster wheel 102 rotates. The purpose for the holes 110 will later appear.

Figure 9:
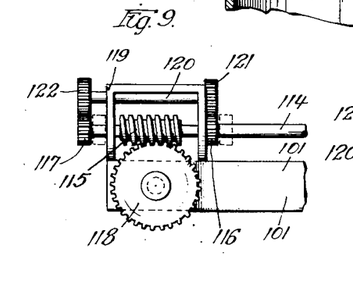
Fig. 9 is a detail plan view showing the arrangement of the steering mechanism for the caster wheel.

The steering rod 22 is connected with its extension 112 by means of the universal joint 113, which extension rod is in turn connected with the end rod 114 by means of a second universal joint 115. As seen in Fig. 9 the end of the rod 114 has mounted thereon the worm gear 115, which worm gear is slidably keyed to the rod 114. Also mounted on the rod 114 and rigidly secured thereto are the pinions 116 and 117. Securely mounted upon the upper portion of the yoke 107 is the gear 118, which gear wheel meshes with the worm gear 115, and is consequently rotated thereby when the steering wheel 23 is operated. In order that the worm gear 115 may be thrown out of mesh with the gear 118 when desired, the tail beam 101 is provided at its free end with a bracket 119, in which bracket is journaled the rod 114. In the outer portion of this bracket is rigidly fixed the shaft 120, upon each end of which are fixed against rotation the gears 121 and 122, which as shown in Fig. 9 mesh with the pinions 116 and 117 when the rod is in the position there shown. Also formed in the bracket 119 are slots 123 in which slots the shaft 114 is mounted. As stated before, the worm gear 115 is slidably keyed on rod 114, as a result of which the rod 114 may by suitably pulling upon the steering wheel 23, be moved longitudinally backward, which movement would place the pinions 116 and 117 in the position shown in dotted lines in Fig. 9, which is the position occupied by these pinions when positive steering of the caster wheel is desired. When it is desired to disengage the worm gear 115 from the gear 118, all that is necessary is to push the steering rod forward which will throw the pinions 116 and 117 into mesh with the gears 121 and 122, and upon then rotating the rod 114 it will be carried upwardly in the slot 123 by virtue of the fact that the shaft 120 is rigidly fixed in the bracket 119, and the gears 121 and 122 fixed to the shaft 120, and thus prevented from rotation. This upward movement of the shaft 114 will obviously disengage the worm gear 115 from the gear 118 thus permitting the caster wheel 102 to swing free or caster.

Upon the rear end of the frame may be formed a suitable bracket or foot rest 124 upon which is pivotally mounted the pedal 125, which will be held in its raised position by the action of the spring 65. Attached to the upper end of the pedal 125 is the cord or line 126 which passes over suitable pulleys 127, 128 and 129 and is attached to the control rod 19, or it may extend directly from the pulley 127 and be attached at any desired point on the control rod 19, the particular arrangement of lines being determined by the direction of travel of the tractor. A similar pedal and line connection can also be arranged for the control rod 20. Also similar pedals may be located on the plow, cultivator, or other farm implement, and lines attached thereto as at 124', Figs. 11 and 12, or if desired the pedals in Figs. 13 and 14 may be placed directly on the plow beams. It is also obvious that a stirrup may be secured to the end of the lines or cords 126 and used in place of the pedals 125.

In the application of our tractor to the work of operating a cultivator (see Fig. 14) the pedal 125 may be pivoted to the shovel beam 150, one pedal on each side of the center line of the cultivator, whereby the feet may be used not only for steering and controlling the movement of the tractor but also, and at the same time, for imparting sidewise or other movement to the cultivator shovels in the customary manner. To assist in this last operation the heel rest 151 may be provided.

Figure 1:
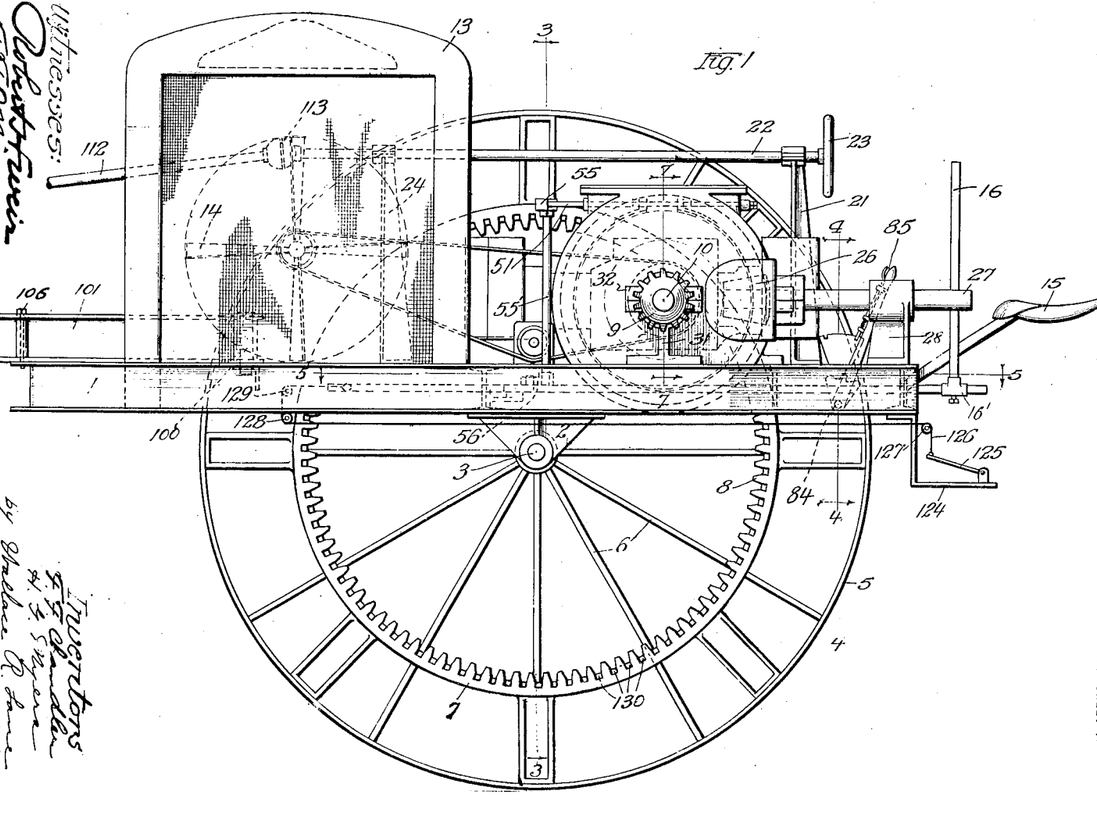
Figure 1 is an elevation of our improved tractor with the near wheel removed for the sake of clearness, and part of the tail beam broken away.
Figure 3:
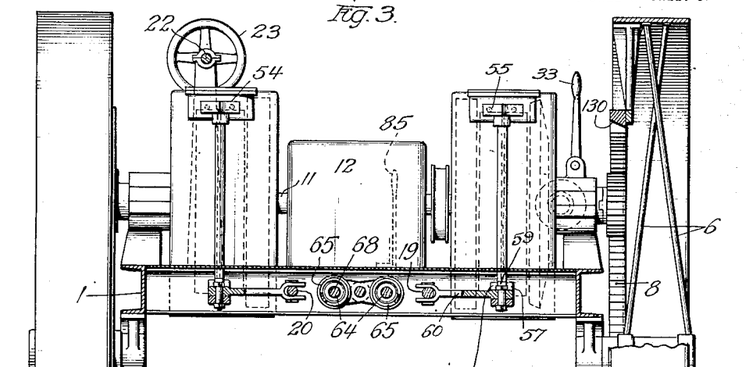
Fig. 3 is a vertical transverse section through the line 3—3 of Fig. 1, one drive wheel being shown partly in elevation and partly in section.

As shown in Figs. 1 and 3, the bottom portion of the recesses between the annular gear teeth 8 are beveled as designated by 130. The purpose of this bevel is to permit any mud that may become lodged between the teeth 8 and the pinion 9 to be forced out instead of firmly packed therebetween. This bevel or inclination may obviously be formed either in one direction as shown at 130, or in both directions, so that any mud may be squeezed out at both sides instead of one side only.

The operation of our improved tractor will now be described. In order to make it travel, for instance, in a direction toward the left, (see Fig. 1,) it is first necessary to move the lever 85 to the left, so that the quadrant lock holds it in that position. The main rod 68 is then pushed toward the left until the notch 96 becomes engaged with the frame 1. This operation produces a compression of the two springs 65, because the yoke 69 is fixedly connected with main rod 68, and when the main rod 68 is pushed toward the left, this yoke 69 therefore pushes the washers 75 and 76 toward the left, and thereby produces compression in the springs. The yoke 70, which is also fixedly connected with the main rod 68, manifestly travels to the left and, therefore, becomes out of contact with the two washers 77 and 78. The two washers 77 and 78 remain in contact with the two collars 67, and are prevented from having lateral movement along the control rods 19 and 20, because the two collars 67 are fixedly connected thereto. Even though the main rod 68 has been moved toward the left as above described, the two control rods 19 and 20 are prevented from moving toward the left by reason of the fact that the fingers 92 and 93 lie in cavities 88 formed in the reverse plates 86 and 87, these cavities 88 having been rotated into the position of cavity 89, (see Fig. 4$^a$,) by the above described placing of the lever 85 in its position to the left of the quadrant, and because these fingers 92 and 93, shown in Fig. 4, are fastened in castings 90 and 91, which latter are fixedly connected with control rods 19 and 20. These control rods are therefore restrained from moving toward the left, except as desired by the operator. While I have illustrated the main rod 68 as being constructed to simultaneously compress the springs 65 it is, of course, obvious that individual means may be used for individually compressing the springs 65, if desired without departing from the spirit of my invention.

The setting of the parts above described therefore places compression in the springs 65, which will give sufficient power for the setting of the bands in the planetary gears to produce motion of the tractor in the following manner: By grasping the handles 16 and 17 (see Fig. 1) and pulling these backward toward the operator by a small amount, the fingers 92 and 93 (see Figs. 4 and 4$^a$) will ride up the inclined portion of the notch 88 in the reverse plates 86 and 87, and will finally lie out of engagement with the reverse plates. Then by quickly releasing the two handles 16 and 17 toward the left, the fingers 92 and 93 hit the raised portions $a'$ of the reverse plates 86 and 87 which project above the line of action, (see Fig. 4$^a$,) and are caused to jump the gaps or cavities 88. It is obvious of course that if desired the projections $a$ and $a'$ may be omitted since the jumping of the gap by the fingers may be determined by the width of the gap and the speed at which the fingers travel; in other words, if the gap be of sufficiently small width and the speed at which the fingers travel sufficiently great these fingers will, as is clearly seen, cross the gap without the necessity of these projections. The fingers then lie in the position $b$ (see Fig. 4$^a$) and if the handles 16 and 17 are then further released toward the left so that the fingers 92 and 93 come into the position $c$, then the two control rods 19 and 20 will have moved the projections 61 so that they will have engagement with bell cranks 60 and 60', and consequently move these toward the left, so that the pins 59 operating in the slots in castings 56 give a turning movement to vertical shafts 55' and through the medium of the tappet castings 55, push the rod 52 to the right, thereby tightening brake band around the drum 46, thus preventing it from moving, and through the medium of the planetary gears hereinbefore described, turn shaft 10, and consequently gear 9 so that movement of the drive wheels 5 is produced in the direction which will give movement of the whole tractor toward the left.

It is obvious that after the control rods 19 and 20 have been released so that they move toward the left to the extent that the clutches are engaged even if one or the other of the same is slightly pulled by the operator toward the right, then a partial or complete disengagement as desired of the clutch parts is secured, which causes either partial or complete stoppage of motion of one or other of the drive wheels 5, allowing the other to continue in motion. By going through this operation of gently pulling one or the other of the control rods 19, 20, a steering movement of the tractor is secured either to the right or left, as desired.

Even though the setting of the control parts above described places the tractor in a condition whereby it will always normally travel to the left, yet even with this setting of parts, it is quite possible to forcibly move the control rods 19 and 20 toward the right until the fingers 92 and 93 pass back to the position shown at $d$ (see Fig. 4$^a$) thus reversing all of the movements above described without changing the setting of the reverse plates 86 and 87. By this operation, the tractor can be made to back if it is considered that movement toward the left is forward. Likewise it is possible to move either of the control rods 19 and 20 toward the right by a varying amount, so that even while the tractor is being backed, it can also be steered. On account of the formation of the reverse plates 86 and 87, it is obviously possible when backing the tractor as above described to gently release the control rods 19 and 20, so that the springs 65 produce slow motion of rods 19 and 20 toward the left, so that the fingers 92 and 93 will gently drop into the cavities 88 in the reverse plates 86 and 87, which cavities 88 have been placed in the position of cavity 89 as shown in Fig. 4ª; thus it is possible to go from backing operation into neutral. It is also obvious that if, when backing, the control rods 19 and 20 are released toward the left rapidly enough to make the fingers 92 and 93 jump the gaps 88 in the control plates 86 and 87, then it will be possible to go directly from backing movement into forward movement.

Inasmuch as the control rod 19 controls that planetary gear with which is incorporated the beveled gearing, which gives motion to the general utility shaft 27, it is therefore obvious that handle 17 can be placed in its neutral position and allowed to remain so while the handle 16 can be made to go through the operations of forward and backing as above described, and if while going through these operations, the clutch 30, controlled by lever 33, has been disengaged, then the general utility shaft 26 can be made to operate either clockwise or anti-clockwise, or can be made to remain stationary as desired.

With this control mechanism, it is also obvious that when, for instance, the control rods 19 and 20 are positioned so that the tractor moves toward the left, then a quick turning movement can be secured by pulling, for instance, handle 16 back by an amount sufficient to reverse the turning movement of its corresponding drive wheel, so that one drive wheel will be traveling in one direction and the other drive wheel in the reverse direction, which will produce a turning movement about a point equally distant between the two drive wheels.

Inasmuch as the construction of the control mechanism above described is such as will permit the complete reversal of the setting of the parts above described, it is therefore obvious that the setting of the reverse lever and main rod can be made so that complete reversal of all movements is secured, thus producing movement of the tractor to the right.

It is obvious from the foregoing description of the control mechanism that it is natural in its operation, because if the tractor is desired to be moved in a predetermined direction, then to secure that movement the handles and control rods are moved in the same direction, thus positively eliminating any possibility of confusion on the part of the operator.

It is also apparent from the foregoing description of the control mechanism that the natural movements of the control rods can be secured by the use of lines or reins attached to the rods at either end of the tractor, and that complete control of the tractor in forward, neutral, or reverse can be secured by handling of said reins, whether the tractor is to be operated forward, backward, or turned to the right or to the left, either when forward motion is considered as being to the left, as in Fig. 1, or to the right; thus making our tractor as easily operated by lines as when driving a horse.

While the driver sits in the seat 15, he may if he desires steer by using the steering wheel 23, which is connected with the caster wheel by the rods, universal joints and gearing, as already described. When steering with the hand wheel the two handles 16 and 17 lie in forward position as desired without the necessity of having to be touched until it becomes necessary to stop, at which time they are pulled into neutral and remain so until they are again released. The worm which engages the caster wheel gear can be disengaged by the operator by simply pushing forward on the steering wheel 23, which throws the pinions 116 and 117 into engagement with the gears 121 and 122, and then rotating the steering rod as hereinbefore described, thus permitting the caster wheel to swing free or caster when desired.

In addition to providing for complete control in either direction by use of the handles 16 and 17, lines or reins can be attached to the control mechanism by passing them through suitable holes in the frame and operating the control rods by merely pulling or releasing such lines or reins. By this arrangement, the operator can pull on the desired line and cause the tractor to turn as efficiently and readily as though the handle 16 or 17 on the side desired had been operated. In this operation and when the caster wheel is free, a pull on the right line will make the tractor turn toward the right, and a pull on the left line will produce a turning movement to the left. Complete reverse can be secured by pulling both lines backward until both reverse clutches are engaged. Or if the operator desires, he may operate these lines by means of the pedal 125 or stirrup as hereinbefore described, the particular manner of operation of these lines or reins being a matter of choice for the operator.

Figures 12, 13:
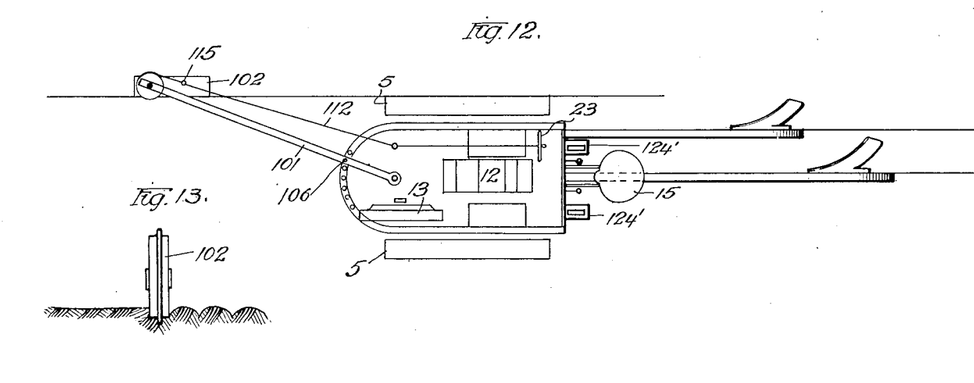
Fig. 12 is a plan view of the device shown in Fig. 11.
Fig. 13 is a fragmentary view showing the caster wheel tracking in a furrow.

In Figs. 11 and 12 is illustrated our tractor as attached to a gang plow, it being obvious, of course, that a single plow or a large number of plows may be pulled if desired, the number of plows to be pulled depending rather on the nature of the soil. The operator sits on the seat 15 with the control handles and steering wheel in convenient position. After the first round has been made, the caster wheel is allowed to drop in the furrow as shown in Fig. 13, then by operating the steering wheel the caster wheel can be turned so that it will hug the vertical side of the furrow which has been made. At the end of the furrow, the worm gear which engages the caster, can be disengaged as before described, so that a short turn can be made by the use of the two control levers 16 and 17. This flexibility of control permits of much time being saved without adding to the complexity of the design. In this operation the tail beam is prevented from turning about its pivot by locating it in the desired position on the frame by means of the pin 106.

Figure 15:
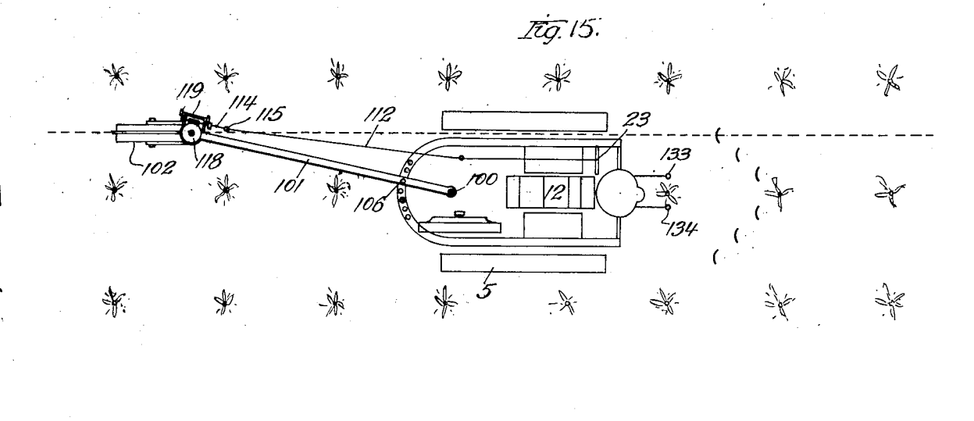
Fig. 15 is a plan thereof.

In Figs. 14 and 15, the application of our tractor to the cultivation of corn is illustrated. The cultivation of corn with a power driven machine has not been heretofore successfully accomplished, for the reason that it involves many difficulties such as the tractor being too wide, too heavy, or insufficiently flexible, also that the cultivators with other forms of tractors have to be pulled. This last difficulty is a most important one because when the cultivator is pulled the operator has to continually watch the cultivator teeth as they pass through the ground, and therefore he cannot watch where the tractor itself is going, which makes it impossible to properly steer. By taking the wheels and the tongue off an ordinary cultivator, and attaching the cultivator to the tractor frame in the position as shown in Figs. 14 and 15, the tractor then in effect pushes the cultivator. The operator sitting in the position shown then has the cultivator teeth in front of him in the ordinary way, so that they can be watched just as if the cultivator was being pulled by horses, and the operation and steering of the tractor are also easily accomplished. When the tractor is thus connected up to a cultivator, the steering handles 16 and 17 are removed and extension handles inserted instead so that these come to a point which is convenient for the operator as indicated at 133 and 134, Fig. 15, it being also noticed that in this figure the operator's seat has been swung around to face the cultivator instead of the caster wheel; the direction of travel being indicated by the arrow in Fig. 14. As before described, the steering may here be done with the feet through the medium of lines if desired. An important feature of our tractor which is extremely useful in such operations as cultivating corn, is the full clearance provided beneath the frame as shown in Fig. 3; there being no projecting or depending parts to interfere with the passage of the frame over the tops of the corn.

As illustrated in Fig. 14, the pipe 135 from the carbureter 136 passes into the roof 137, which is constructed with an interior chamber 138 incased with suitable air filtering material, whereby all air that enters the carbureter through this chamber and pipe will be free from any particles of sand or dust when the tractor is being operated in a sandy or dusty country. This device will be located over the operator's seat to provide suitable shade for the operator.

When the main rod 68 is in neutral position, (i. e. the notch 97 engaged over the edge of the slotted frame 1,) the springs 65 will tend to hold the control rods in neutral position. However, if the main rod is in the notch 98, (which would operate both drive wheels backwardly,) or the notch 96 (which would give a forward motion to both wheels,) either control rod, or both, may still be operated, due to the resiliency of the springs 65, into the opposite position independently of the main rod. This means that the main rod 68 can be set for either forward or backward motion, and yet the control rods may either or both be independently operated to change this motion as desired. This is considered quite an important feature in our tractor.

While we have shown and described a planetary gearing as forming part of the transmission mechanism, we do not wish to be limited to this particular form of gearing, since other types of gearing may be effectively used, as well as other changes made, without departing from the spirit of our invention.

Having now described our invention, we claim:—

1. In a tractor, a frame having drive wheels, mechanism for driving said wheels, and control means for said mechanism constructed to be so set that normal forward movement of the tractor may be obtained in either a right hand or left hand direction as viewed from one side of the tractor, by movement of the control means in the direction of desired normal forward travel, and when set for normal forward movement in either of these directions a corresponding forward or backward travel of the tractor may be obtained by control movements in the same direction as that of the desired travel, and no travel obtained by a mid-positioning of the control means, and means for completely reversing the setting of the control means to normally operate in the opposite direction.

2. In a tractor, a frame having drive wheels, mechanism for driving said wheels in either direction, and control means for said mechanism arranged to be selectively set to give normal forward travel of the tractor either to the right or to the left when viewed from one side of the tractor, said control means when set to give normal forward movement to the right always normally producing travel of the tractor in that direction unless forcibly moved to neutral or reverse, and when set to give normal forward movement to the left always normally producing travel of the tractor in that direction unless forcibly moved to neutral or reverse position.

3. In a tractor, a frame having drive wheels, mechanism for driving said wheels in either direction, and control means for said mechanism arranged to be selectively set for giving a normal forward travel of the tractor to either the right or left when viewed from one side of the tractor, and during which setting forward, neutral or backward travel of the tractor may be effected by permitting the control mechanism to normally move forward, forcibly moving it to neutral, or forcibly moving it backward beyond neutral, respectively, and means for securing a complete reversal of the setting of the control means to give a normal forward travel of the tractor in the opposite direction, whereby forward, neutral, or backward travel of the tractor may be effected by permitting the control mechanism to normally move in the new forward direction, forcibly moving it to neutral, or forcibly moving it beyond neutral in the new backward direction respectively.

4. In a tractor, a frame having drive wheels, mechanism for rotating said drive wheels in either direction, control means for said mechanism producing forward tractor travel by control movement in direction of tractor forward travel, backward tractor travel by control movement in direction of backward tractor travel, neutral or no travel by a midway positioning of control means, and a complete reversal of all tractor travel directions by the shifting of a portion of said control means in the desired direction of tractor travel, permitting the operator to select at his option a forward travel which may be in one of two directions with the ability to stop, start or reverse and always by natural movement of control means in the direction of desired travel.

5. In a tractor, a frame having drive wheels, mechanism for rotating said drive wheels in either direction, control means for selectively producing normal forward movement either to the right or left as viewed from one side of the tractor, and means for completely reversing the setting of said control means to produce normal forward movement in the opposite direction.

6. In a tractor, driving mechanism for propelling said tractor in either direction, control means for said driving mechanism for selectively producing normal forward movement of the tractor either to the right or left as viewed from one side of the machine, and means for normally causing the control means to move out of backing position regardless of whether normal forward be to the right or to the left, whereby should the operator become excited during backing, the mere release of the control will stop any further backward movement and prevent accidents.

7. In a tractor, a frame, drive wheels, mechanism for driving said wheels simultaneously in the same or opposite directions at the same or different speeds, whereby the tractor may be steered by the drive wheels, control means for producing normal forward motion of the tractor selectively in either direction as viewed from one side of the tractor, means for producing forward or backward movement of the tractor regardless of which direction is normal forward and operable in the same direction as that of the desired travel, said last mentioned means also effecting steering of the tractor in a manner similar to driving a horse, and means for completely reversing the setting of the control means to throw all control operations in the opposite direction to accommodate the shift of normal forward from one direction to the other to at all times give natural movements of control for the operator.

8. In a tractor, drive wheels, a frame supported on said drive wheels, driving mechanism on said frame for driving said wheels in either direction, resiliently mounted control means for said mechanism, means for putting said control means under compression in either direction whereby to selectively cause a normal tendency of the control means to move either to the right or the left as viewed from one side of the machine, according to which of these directions is desired as normal forward tractor travel, and means for so operating said control means by movement in the desired direction of travel to produce forward or backward movement regardless of which direction is considered normal forward.

9. In a tractor, a frame, a pair of drive wheels, mechanism for driving said drive wheels, a control rod in said frame, a spring for exerting a pressure longitudinally of said rod, connecting means between said control rod and said driving mechanism, said control rod being arranged that it may be actuated by a handle, line, pedal or the like, and means for selectively compressing said spring to exert its force on said control rods in either longitudinal direction as desired.

10. In a tractor, a frame, a pair of drive wheels, a pair of spring pressed control rods in said frame, driving means for said wheels actuated by said control rods, means for simultaneously throwing both control rods into forward, backward or neutral position, and further means for selectively throwing either control rod into forward, backward or neutral position as desired, and means for selectively exerting the spring pressure on said control rods in either longitudinal direction as desired.

11. In a tractor, a frame, driving means on said frame, a control rod slidably mounted in said frame, a transverse shaft mounted in said frame, a reverse lever on said shaft, a reverse plate on said shaft, a notch in said plate, a block secured to said control rod, a finger pivoted in said block, and a rest secured to said frame, whereby when the end of said finger engages said rest, the control rod is capable of motion in either direction, and when it engages said notch, said control rod is capable of motion in only one direction.

12. In a tractor, a frame, driving means on said frame, a control rod slidably mounted in said frame, a transverse shaft in said frame, a reverse lever on said shaft, a reverse plate on said shaft, two notches in said plate, one face of each notch forming a cam surface, a block secured to said control rod adjacent said plate, a finger pivoted in said block, spaced rest portions secured in alinement to said frame, whereby when the end of said finger engages either of said rest portions the control rod is capable of motion in either direction, and when it is in one of said notches the control rod is capable of motion in only one direction, while when it is in the other of said notches said control rod is capable of motion only in the opposite direction.

13. In a tractor, a frame, driving means on said frame, two control rods slidably mounted in said frame, a transverse shaft in said frame, a reverse lever on said shaft, a reverse plate on each end of said shaft, two notches in each of said plates, one face of each notch forming a cam surface, a block secured to each of said control rods adjacent said plates, a finger pivoted in each of said blocks, spaced rest portions secured in alinement to said frame adjacent each of said plates, whereby when the end of said fingers engages either of the respective rest portions the control rods are capable of motion in either direction, and when said fingers are in one pair of said notches the control rods are capable of motion in only one direction, while when they are in the other pair of said notches, said control rods are capable of motion only in the opposite direction.

14. In a tractor, a frame, driving means on said frame, a control rod slidably mounted in said frame, a member pivotally mounted on said control rod, a reverse plate mounted for oscillation adjacent said member, a notch in said plate, one side of said notch being inclined, a rest portion secured to said frame adjacent said plate, a corner of said plate when in its extreme position projecting above the top of said rest, whereby when said pivoted member is moved longitudinally along said rest and over said corner sufficient inertia will be given said member to cause it to jump over said notch.

15. In a tractor, a frame, a control rod slidably mounted in said frame, a member pivotally mounted on said control rod, a reverse plate mounted for oscillation adjacent said member, two notches in said plate, one side of each of said notches being inclined, two spaced and alined rest portions secured to said frame adjacent said plate, the end of each inclined portion forming a corner which may by turning said plate be respectively made to extend above one of said rests, whereby when said pivoted member is moved along one of said rests and over said corner, it will be given sufficient inertia to cause it to jump over the nearest notch and land on said other rest portion.

16. In a tractor, a pair of drive wheels, an annular gear carried by each of said wheels, a pinion engaging each of said gears, planetary gearing connected for driving each of said pinions, means for disconnecting said pinions from said planetary gearing, means for driving said planetary gears, a spring pressed control rod for each of said planetary gearing, and means for actuating said control rods to control the direction of rotation and speed of said drive wheels as desired.

17. In a tractor, a frame, control rods for operating said tractor slidably mounted in said frame, springs normally pressing said rods in one direction, a main rod operatively connected to said control rods, said connection between said main rod and said control rods being resilient whereby the direction of travel of said tractor may be governed by operating said main rod, and also varied as desired by further operating said control rods without disturbing the position of said main rod.

18. In a tractor, a control rod, a main rod operatively connected to said control rod, said connection between said main rod and said control rod being designed to permit the actuation of said control rod by the actuation of said main rod, and also permit further actuation of the control rod without disturbing the position of the main rod.

19. In a tractor, driving means, a control rod, spaced projections on said rod, a bell crank extending between said projections, an oscillatory member operated by said bell crank, projections on said oscillating member, rods engaging said projections, said rods being operatively connected to suitable driving means, whereby said driving means may be suitably controlled by actuation of said control rod.

20. In apparatus of the class described a frame, a control rod slidably carried by said frame, a member pivotally mounted on said control rod, a notched oscillatory reverse plate adjacent said member, and a rest portion at each end of said notch but separate therefrom, upon which said member is adapted to rest, whereby said member may jump across said notch when said control rod is moved at sufficient speed longitudinally or drop into said notch when the control rod is moved at a slow speed.

21. In apparatus of the class described a frame, a control rod slidably carried by said frame, a spring associated with said rod and adapted to store up energy upon longitudinal movement of said rod, a member pivotally mounted on said control rod, a notched oscillatory reverse plate adjacent said member, and a rest portion at each end of said notch but separate therefrom upon which said member is adapted to rest, whereby said member may jump across said notch when said control rod is moved at sufficient speed longitudinally or drop into said notch when the control rod is moved at a slow speed.

22. In apparatus of the class described a frame, a control rod slidably carried by said frame a spring associated with said rod, and means for compressing said spring in either direction whereby the same is capable of imparting longitudinal movement to said rod in the desired direction.

23. In apparatus of the class described a frame, a pair of control rods slidably carried by said frame, a spring on each of said rods adapted to be compressed in either direction whereby to tend to impart movement to its respective rod, and means for compressing said springs whereby said rods may be manually moved slowly or may be made to move quickly under the action of said springs.

24. In a tractor, driving mechanism for propelling said tractor in either direction, control means for said driving mechanism for selectively producing normal forward movement of the tractor either to the right or left as viewed from one side of the machine, as well as turning movement of the tractor when operating either forward, backward, or turning about its center, and means for normally moving the control means into position for forward straight line tractor travel if suddenly released, and into position for neutral tractor travel if released slowly, whereby the release of the control by the operator under excitement will prevent accident when backing either in a straight or curved line, or making a short turn.

In witness whereof, we hereunto subscribe our names to this specification in the presence of two witnesses.

FRANKLIN F. CHANDLER.
HENRY G. MYERS.